Jan. 13, 1953 W. O. VARNER 2,625,407
FOLDABLE WHEELED VEHICLE FOR INFANTS
Filed Sept. 15, 1949 4 Sheets-Sheet 1

INVENTOR.
WILLIAM O. VARNER
BY Clifford C. Bradbury
ATTORNEY

Jan. 13, 1953          W. O. VARNER          2,625,407
FOLDABLE WHEELED VEHICLE FOR INFANTS
Filed Sept. 15, 1949          4 Sheets-Sheet 2
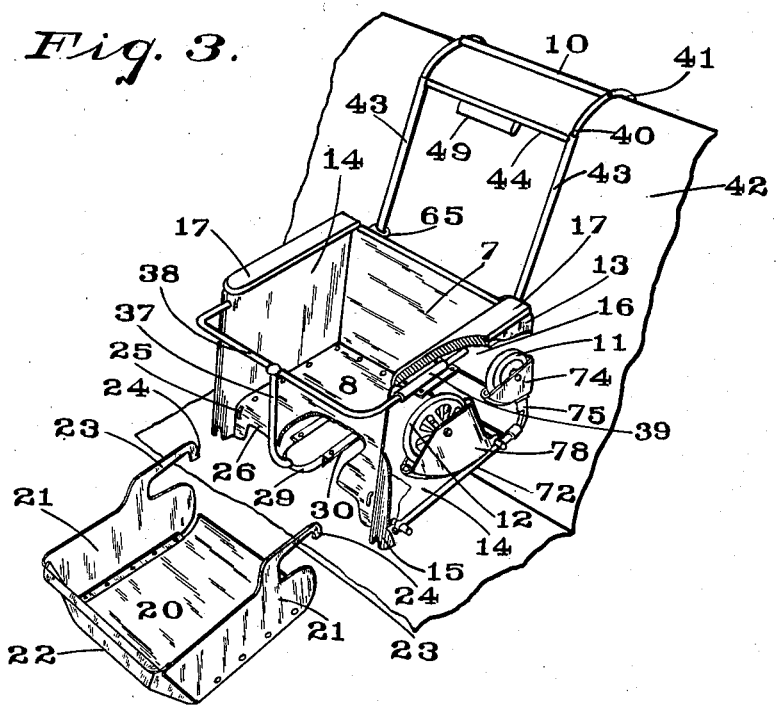
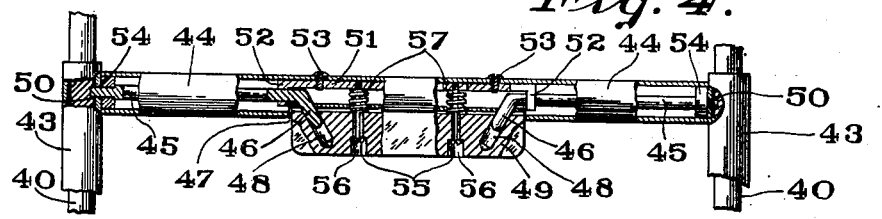
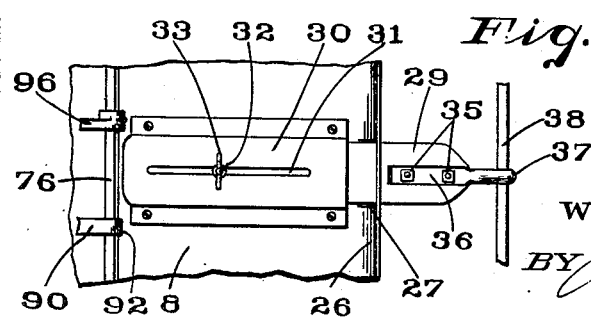
INVENTOR
WILLIAM O. VARNER.
BY Clifford C. Bradbury
ATTORNEY

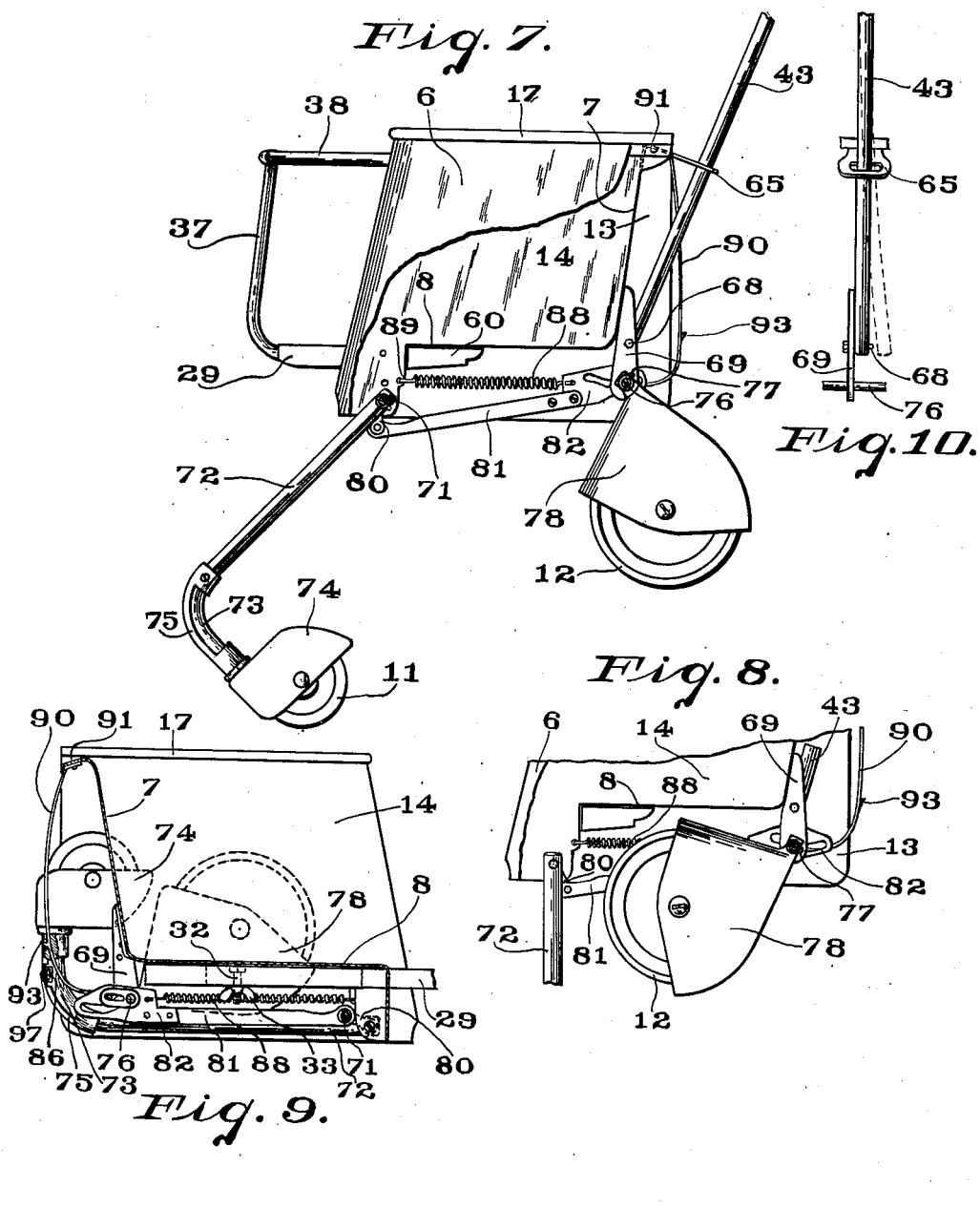

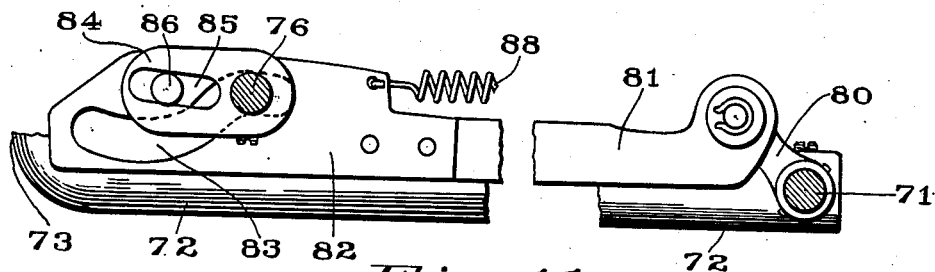
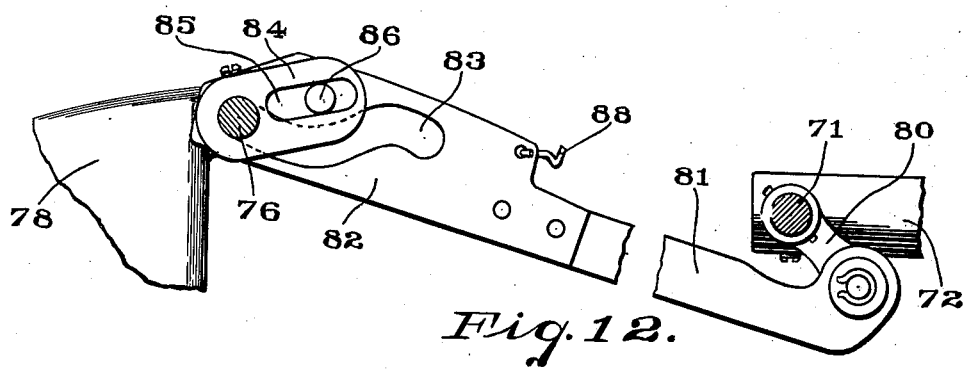
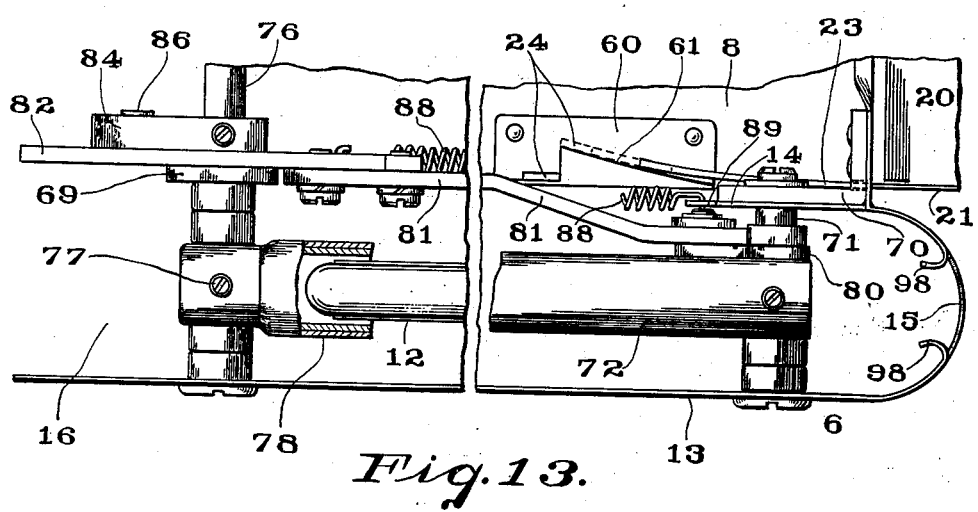
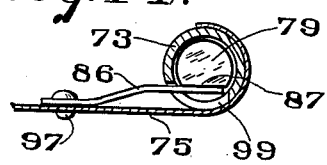

Patented Jan. 13, 1953

2,625,407

UNITED STATES PATENT OFFICE 2,625,407

FOLDABLE WHEELED VEHICLE FOR INFANTS

William O. Varner, Versailles, Ohio

Application September 15, 1949, Serial No. 115,867

4 Claims. (Cl. 280—41)

This invention relates to a wheeled vehicle for infants, and more particularly to an adjustable device of this type which by simple manipulation may be adjusted to serve as a stroller, a walker and an automobile seat for the infant.

One object of the invention is to provide a structure of few and simple parts which may be simply and quickly manipulated into any one of its various positions of adjustment for its different functions.

Another object of the invention is to provide a structure in which the wheels may be folded into a completely concealed position within the body of the structure by a simple manipulation of one set of wheels.

Another object of the invention is to provide a novel form of operating mechanism between the front and rear wheels of the vehicle for controlling the adjustment of the wheels into and out of operative position.

Another object of the invention is to provide a structure of the above nature which will prevent soiling of the upholstery of the automobile when the device is used in the car.

Other features of novelty relate to details of construction for providing an adjustable and removable handle, an adjustable seat, and a removable foot rest.

My invention is illustrated in the accompanying drawings, in which

Fig. 3 is a perspective view with parts broken away and parts removed as adjusted for attachment to the seat of an automobile.

Fig. 4 is a view in side elevation, with parts in section, of the handle adjustment mechanism.

Fig. 5 is a bottom view of the handle adjustment grip.

Fig. 6 is a fragmentary bottom view of the walker adjustment feature.

Fig. 7 is a view in side elevation, with parts broken away, showing the wheels and the folding mechanism in the first stage of the folding position.

Fig. 8 is a fragmentary side elevational view, with parts broken away, illustrating the position of the operating mechanism in an intermediate position of adjustment.

Fig. 9 is a fragmentary side elevational view in reverse position of the mechanism with the wheels in a fully collapsed position.

Fig. 10 is a fragmentary detail view of the handle attachment means.

Fig. 11 is an inverted side elevational view on an enlarged scale of the wheel collapsing mechanism in the concealed position of the wheels.

Fig. 12 is a view similar to Fig. 11 showing the position assumed by the mechanism in the fully extended position of the wheels.

Fig. 13 is a fragmentary bottom plan view of the wheel collapsing mechanism, and Fig. 14 is a detail sectional view of a front wheel support.

Figure 1:
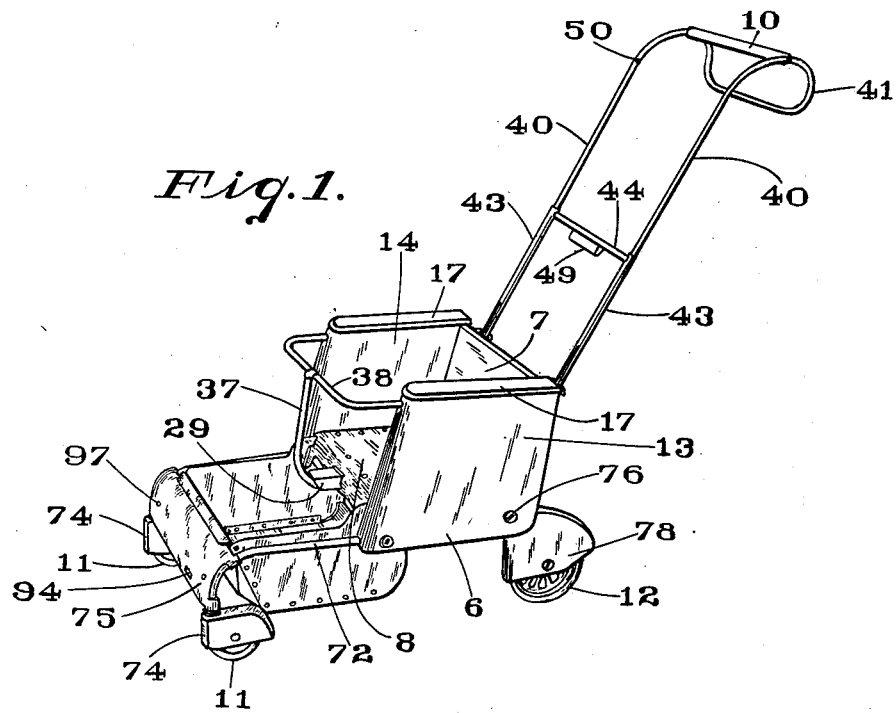
Fig. 1 is a perspective view of the vehicle in stroller position of adjustment.
Figure 2:
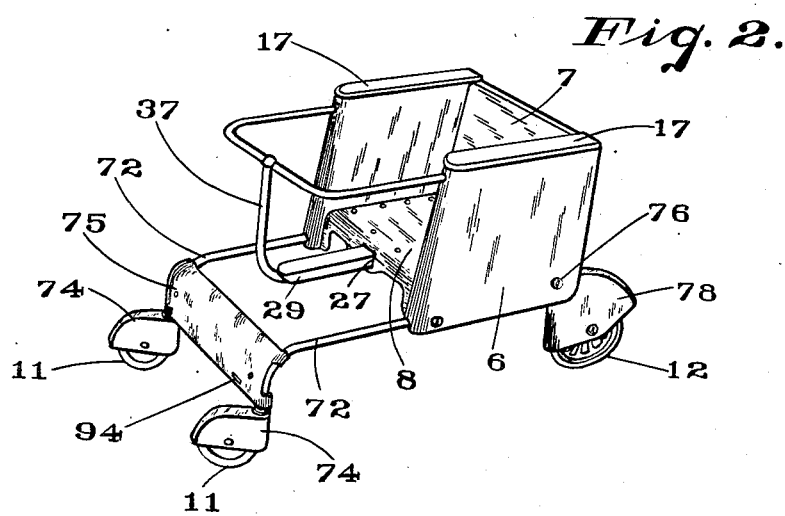
Fig. 2 is a perspective view of the device in walker adjustment.

Referring to Figs. 1, 2 and 3, the body is comprised of sides 6, a back rest 7, a seat 8, a removable foot rest, an adjustable and removable handle 10, front wheels 11, and rear wheels 12.

Each side 6 comprises two parallel plates 13 and 14 joined at their front ends by a curved portion 15 to form a cavity or receptacle 16 between them to house pairs of wheels 11 and 12 when the vehicle is in a collapsed position. This is best illustrated in Figs. 3 and 13.

An arm rest 17 is secured between and overlies the upper edges of each of the pairs of parallel plates 13 and 14 forming the body sides.

The removable foot rest comprises a bottom plate 20, side plates 21, and a front plate 22. Formed upon the inner ends of the side plates 21 are fingers 23 with downwardly projecting hooks 24. Slots 25 in the downwardly turned front edge 26 of the seat 8 receive these hooked fingers in the normal position of the foot rest.

Extending through an opening 27 in the seat portion 26 is a slide member 29 slidable in a guide member 30 secured to the bottom face of the seat 8. The guide member 30 is provided with a longitudinal slot 31. A bolt 32, which is secured to the slide member 29, extends through the slot 31 to receive a clamping wing nut 33. (See Figs. 1, 2 and 6.)

Secured by bolts 35 to the lower front face of the slide member 29 is a plate 36 terminating in a forwardly and upwardly extending rod 37. The upper end of the rod 37 is attached to a horizontal U-shaped rod 38 having its legs passing through openings in the curved portions 15 of the sides 6 into sliding engagement with sockets 39 secured to the lower faces of the arm rests 17. The horizontal rod 38 serves to restrain the infant and to provide a hand grip for it in the walker position of the vehicle.

The handle 10 comprises a pair of rods 40 connected together at their upper ends, and provided with a hook portion 41 adapted to engage a seat back 42 to support the device on an automobile seat as shown in Fig. 3. The rods 40 are slidable in tubular members 43 secured to the back of the seat 7.

Extending transversely between the upper ends of the tubular members 43 is a tubular member 44 welded to the members 43 and opening therethrough. Located within the tubular member 44 are a pair of sliding rods 45 having angularly disposed ends 46 extending outwardly through a slot 47 in the member 44 and into engagement with angularly disposed guide holes 48 in a movable hand grip 49. The grip 49 is movable in the slot 47 and transversely of the tubular member 44 to draw the ends of rods 45 toward each other and out of engagement with locking depressions 50 in the rods 40 to release these rods for sliding movement in the tubular members 43.

A plate 51 with right angled ends 52 is secured by screws 53 to the inside of the tubular member 44, and these ends provide supporting guides for the inner ends of the rods 45, the outer ends of which pass through guide and stop blocks 54 at opposite ends of the member 44.

Screw studs 55, which pass freely through holes 56 in the hand grip 49, are secured to the plate 51, and are surrounded by compression springs 57, which bear at their opposite ends against the plate 51 and the hand grip 49. The restoring force of the springs 57 against the lower face of the grip 49 will exert sufficient pressure between the bent ends 46 of the rods 45 and the sloping surfaces of the guide holes 47 to force the rods 45 into locking engagement with the rods 40 when pressure upon the hand grip is released.

The above described construction provides for an easy one handed manipulation of the handle to adapt it either for stroller use or for use as a seat in an automobile.

A pair of angle plates 60 (one being shown in Fig. 13) are secured to the underside of the seat 8. Formed upon one edge of each plate is an angularly disposed latch member 61 adapted to be engaged by the hook end 24 of the fingers 23 on the side plates 21 of the foot rest 20 to hold the foot rest in position. By pressing the fingers 23 inwardly, the foot rest 20 may be released for withdrawal from the body.

The tubular members 43 of the handle extend through slotted brackets 65 attached to the top of the back rest 7. The lower ends of the tubular members are provided with holes which are engaged by studs 68, carried by brackets 69, attached to the lower back corners of the body 5. (See Figs. 7 and 10.)

Outward spring pressure exerted by the handle 10 spreads the lower ends of the tubular members 43 against the inner faces of the bracket members 69 to hold the handle in place. When it is desired to remove the handle entirely to provide a walker, the lower ends of the tubular members 43 are sprung toward each other to clear the studs 68 and the handle may be removed by sliding the tubular members 43 upwardly through the slotted brackets 65. The walker is made complete by the removal of the handle and the foot rest, and by the forward adjustment of the slide member 29.

An angular corner plate 70 is secured to adjacent corner portions of the side plates 14 and the downwardly turned edge of the seat 8 at the forward lower corners of the body 5. (See Fig. 13.) A shaft 71 is rotatably mounted between one leg of each of the angular plates 70 and the opposite outside plates 13 of the side members 6 of the body. A wheel support 72, having a downwardly curved end 73, adapted to receive a caster sheave 74, within which a front wheel is rotatably supported, is bolted to each shaft 71. The tubular supports are tied together at their forward ends by a plate 75 so that they may be rotated together around their supporting shafts. (See Fig. 7.)

A shaft 76 is rotatably supported between the rearward lower corners of the sides 6. (See Figs. 11, 12 and 13.) Protecting sheaves 78 within which the rear wheels 12 are rotatably mounted are secured to the shaft 76 by means of screws 77.

When collapsing the vehicle for attachment to an automobile seat as shown in Fig. 3 of the drawings, the front wheels are swung through an arc of approximately 180 degrees and the rear ones through an arc of approximately 160 degrees to positions where all four wheels are nested in the pockets or cavities 16 formed between the two members 13 and 14 of the side walls 6.

The wheels are all moved simultaneously by swinging the front wheels down and forward from the collapsed position. In order to accomplish this movement, a cam and link connection is provided between the front wheel shaft 71 and the shaft 76 to which the rear wheels are connected. This cam and link mechanism is clearly shown in Figs. 11, 12 and 13. A link 80, the outer end of which is pivotally connected with a strip 81, is secured to the shaft 71 of one front wheel. A plate 82, secured to one end of the strip 81, is provided with a reverse cam slot 83, which has sliding movement with the rear wheel shaft 76. A crank arm 84, provided with a slot 85, is secured to rotate with the shaft 76. A pin 86, secured to the plate 82, extends through the slot 85 in the crank arm 84.

The operation of the parts above described will be traced on the inverted views as shown in Figs. 11 and 12. In the position of the parts as shown in these views, the shaft 71, upon being rotated by the tubular wheel support 72, will move the outer end of the link 80 through an arc of approximately 180 degrees, and this will move the plate 82 longitudinally and also vertically in accordance with the movement of the cam slot over the shaft 76. These two movements of the plate 82 will move the pin 86 in the slot 85 of the crank arm 84 in a manner to limit the total rotational movement of the crank arm and shaft 76 to the same degree of movement as that required to move the rear wheels from their fully collapsed to their fully extended positions. The operation for collapsing the wheels will result by reversing the operation above described.

A tension spring 88, connected between the plate 82 and a downwardly extending ear 89 on the plate 14 of side member 6, serves to prevent the mechanism locking on dead center.

When the wheels are collapsed into the sides of the body as above described, the sheaves in which the wheels are supported will be in an inverted position and will catch and retain all of the road dirt on the tires, thus preventing soiling of the seat upholstery.

A retaining spring latch member 90 is attached at one end to the underside of a flange 91 at the upper edge of the back 7. The member 90 is bowed downwardly and inwardly with a hook portion 92 which engages over the shaft 76. A projecting ear 93, struck outwardly from the latch 90, engages in a retaining opening 94 through the tie plate 75 of the front wheel supporting members.

An upwardly projecting stop member 96, secured to the shaft 76, engages the outer face of the back member 7 to hold the back wheels 12 in their pavement engaging position.

Flat springs 86 (Figs. 9 and 14) are secured to the underside of the plate 75 near each end thereof. The outer end of each of the springs extends through an opening 99 in the downwardly curved end 73 of the tubular support 72, and engages a flattened portion 87 on the caster stem 79. The engagement of the spring 86 with the caster stem 79 restrains the front wheels against swinging too freely when the device is used as a stroller, but does not offer sufficient restraint to interfere with its use as a walker.

As shown in Fig. 13, clamping ears 98 are struck inwardly at the lower end of the curved portions 15 of the sides 6 to form spring clamps for the tubular front wheel supporting member 72 when they are extended into surface engaging position of the front wheels.

Although I have shown and described my invention with respect to certain details of construction, it is to be understood that I do not wish to be unduly limited thereto, certain modifications being possible without departing from the spirit or scope of my invention.

I claim:

1. A collapsible vehicle of the class described comprising a body formed with rearwardly and downwardly opening cavities in its sides, bodily movable rear and front wheels adapted to be swung into the cavities, a shaft to which the rear wheels are secured for bodily movement therewith into the cavities, a front wheel support, a shaft to which the front wheel support is attached for swinging movement into a cavity, a plate movable longitudinally by rotation of the front wheel shaft, said plate being provided with a cam slot with which the rear wheel shaft engages, a slotted crank arm attached to the rear wheel shaft to rotate therewith, and a pin attached to the plate and extending through the slot in the crank arm for adjusting the relative bodily turning movement of the front and rear wheels.

2. In a vehicle of the class described, a body portion formed with rearwardly and downwardly opening cavities in its sides, front and rear supporting wheels for the vehicle, sheaves covering the wheels and opening downwardly when the vehicle is resting on the wheels, bodily swinging supports for the front wheels adapted to be swung backwardly and upwardly into nesting position in the cavities of the body with the front wheel sheaves in position behind the rear wheel sheaves, and means to swing the rear wheel sheaves forwardly into said cavities in response to the rearwardly swinging of the front wheels.

3. In a vehicle of the class described, a body, tubular wheel supporting members pivotally supported upon the body, each provided adjacent its lower end with a transverse opening, a wheel supporting stem extending into the lower end of a tubular member, said stem being provided with a flat portion, a tie plate extending between the outer ends of the tubular members, and a spring mounted on the underside of the tie plate and extending through the slot in the tubular member into engagement with the flat portion of the wheel supporting stem.

4. In a vehicle of the class described, a body portion formed with rearwardly and downwardly opening cavities in its sides, a pair of rear wheels, bodily movable supports for said rear wheels, a rotatable shaft to which the rear wheel supports are attached, a pair of front wheels, bodily movable supports for the front wheels, a supporting shaft to which one of the front wheel supports is attached, the wheel supports being bodily movable into concealed position in the side cavities by swinging movement of the front wheel supports, a plate having a slot therein through which the rear wheel shaft extends, said plate connecting between the front supporting shaft and the rear wheel supporting shaft movable endwise responsive to the rotation of the front wheel supporting shaft, and eccentric means carried by the rear wheel supporting shaft having a slot therein, a pin on said plate near the slot in said plate, said pin extending through the slot in said eccentric means to rotate the rear wheel supporting shaft as the rear wheel supporting shaft engages successive positions along the slot in said slotted plate.

WILLIAM O. VARNER.

REFERENCES CITED

The following references are of record in the file of this patent:

UNITED STATES PATENTS

| Number | Name | Date |
|---|---|---|
| 824,622 | Butterworth | June 26, 1906 |
| 870,739 | McIntyre | Nov. 12, 1907 |
| 1,093,322 | Foyer | Apr. 14, 1914 |
| 1,113,280 | Ambler | Oct. 13, 1914 |
| 1,125,441 | Bailey | Jan. 19, 1915 |
| 1,591,681 | Pinheiro | July 6, 1926 |
| 2,171,013 | Stinson | Aug. 29, 1939 |
| 2,241,799 | Welsh | May 13, 1941 |
| 2,276,792 | Peltier | Mar. 17, 1942 |
| 2,300,425 | Kiesow | Nov. 3, 1942 |
| 2,552,656 | Vargo | May 15, 1951 |

FOREIGN PATENTS

| Number | Country | Date |
|---|---|---|
| 238,409 | Great Britain | Aug. 20, 1925 |